US012016499B2

(12) United States Patent
Somekh

(10) Patent No.: US 12,016,499 B2
(45) Date of Patent: Jun. 25, 2024

(54) AUTOMATIC WET WIPE PAPER-TOWEL DISPENSER

(71) Applicant: Meir Hay Somekh, Kfar Daniel (IL)

(72) Inventor: Meir Hay Somekh, Kfar Daniel (IL)

( * ) Notice: Subject to any disclaimer, the term of this patent is extended or adjusted under 35 U.S.C. 154(b) by 7 days.

(21) Appl. No.: 17/794,425

(22) PCT Filed: Mar. 2, 2020

(86) PCT No.: PCT/IL2020/050234

§ 371 (c)(1), (2) Date: Jul. 21, 2022

(87) PCT Pub. No.: WO2021/176435

PCT Pub. Date: Sep. 10, 2021

(65) Prior Publication Data

US 2023/0087888 A1 Mar. 23, 2023

(51) Int. Cl.

*A47K 10/36* (2006.01)
*B05B 7/06* (2006.01)
(Continued)

(52) U.S. Cl.

CPC .......... *A47K 10/3606* (2013.01); *B05B 7/062* (2013.01); *B05B 7/1272* (2013.01); (Continued)

(58) Field of Classification Search

CPC .......... A47K 10/3606; A47K 2010/328; A47K 2010/365; A47K 10/32; B05B 7/062; (Continued)

(56) References Cited

U.S. PATENT DOCUMENTS 3,667,682 A * 6/1972 Purnell ................. B05B 7/1272 239/412
5,207,352 A 5/1993 Porter et al.
(Continued)

FOREIGN PATENT DOCUMENTS

DE 3922159 A1 1/1991
DE 202011105459 1/2012
(Continued)

OTHER PUBLICATIONS http://www.hasuco.com/elec/elec_01a.htm, HT1005 Wet Towel Dispenser, retrieved on Nov. 17, 2022, 2 pp.
(Continued)

*Primary Examiner* — Donnell A Long
(74) *Attorney, Agent, or Firm* — The Roy Gross Law Firm, LLC; Roy Gross

(57) ABSTRACT

A non-drip hygiene dispenser for dispensing a wipe paper-towel while keeping a clean and sterile working area comprises (a) a wipe paper-towel, (b) at least one reservoir containing liquid, (c) a first stream of compressed air, (d) a second stream of compressed air, an anti-dripping nozzle, (e) rolling means, and (f) cutting means. The anti-dripping nozzle further comprises activating means and a dispensing tip. The activating means comprises a retractable anti-drip needle backed by a spring. The spring retracts backwards when compressed air of the first stream of compressed air presses the spring, thus retracts the anti-drip needle, and thus, unblocks the dispensing tip to allow liquid from the at least one reservoir to flow through the dispensing tip. When the compressed air pressing the spring is released, the retractable anti-drip needle returns to its original place, blocking the dispensing tip to block the passage of liquid remained in the dispenser immediately upon shut off of the dispenser, thus, to avoid undesired dripping. The second stream of compressed air entering the anti-dripping nozzle
(Continued)

mixes with the sprayed liquid in order to form a foggy environment around the wipe paper-towel.

20 Claims, 6 Drawing Sheets

(51) Int. Cl.
*B05B 7/12* (2006.01)
*B05B 7/16* (2006.01)
*B05B 7/24* (2006.01)
*A47K 10/32* (2006.01)

(52) U.S. Cl.
CPC .......... *B05B 7/1626* (2013.01); *B05B 7/2491* (2013.01); *A47K 2010/328* (2013.01); *A47K 2010/365* (2013.01)

(58) Field of Classification Search
CPC ... B05B 7/1272; B05B 7/1626; B05B 7/2491; B05B 7/0416
See application file for complete search history.

(56) References Cited

U.S. PATENT DOCUMENTS

| | | | | |
|---|---|---|---|---|
| 5,447,254 | A | 9/1995 | Hoover et al. | |
| 5,829,278 | A | 11/1998 | Koo | |
| 6,085,899 | A | 7/2000 | Thorsbakken | |
| 6,170,426 | B1 | 1/2001 | Thorsbakken | |
| 6,457,434 | B1 | 10/2002 | Lazar | |
| 6,467,651 | B1 * | 10/2002 | Muderlak | B05B 12/02 222/63 |
| 8,844,766 | B2 * | 9/2014 | Zaima | G16H 40/20 222/162 |
| 2002/0187276 | A1 * | 12/2002 | Zhang | A47K 10/3625 427/458 |
| 2004/0211229 | A1 | 10/2004 | Ohyama | |
| 2005/0171634 | A1 * | 8/2005 | York | G07F 11/68 700/231 |
| 2007/0181594 | A1 | 8/2007 | Thompson | |
| 2007/0272701 | A1 | 11/2007 | Carlsson et al. | |
| 2009/0294471 | A1 * | 12/2009 | Paige | G04G 13/026 222/646 |
| 2012/0138123 | A1 * | 6/2012 | Newdoll | H02S 50/10 136/246 |
| 2015/0048116 | A1 * | 2/2015 | Orita | B67D 3/0038 222/64 |
| 2015/0199865 | A1 * | 7/2015 | Wegelin | B05B 12/08 221/21 |
| 2016/0180688 | A1 * | 6/2016 | O'Toole | G06Q 10/06 340/517 |
| 2017/0319014 | A1 * | 11/2017 | Ophardt | B65F 1/14 |
| 2019/0357735 | A1 * | 11/2019 | Wise | A47K 5/14 |

FOREIGN PATENT DOCUMENTS

| | | | |
|---|---|---|---|
| IL | 262332 | B | 11/2018 |
| JP | 2005125219 | | 5/2005 |
| KR | 20010010003 | | 2/2001 |
| KR | 100542835 | | 1/2006 |
| WO | 99/04677 | A1 | 2/1999 |
| WO | 0060990 | | 10/2000 |
| WO | 2006088334 | A1 | 8/2006 |

OTHER PUBLICATIONS https://www.youtube.com/watch?v=4xVaObJppsE, Wet Towel Dispenser by Hasuco Korea, retrieved Nov. 17, 2022, 26 pp.
https://www.youtube.com/watch?v=LnHulBRHzpl, wet towel dispenser China Supplier, retrieved Nov. 17, 2022, 26 pp.
International search report for PCT/IL2020/050234 dated Jun. 4, 2020.
Written opinion for PCT/IL2020/050234 dated Jun. 4, 2020.
European Patent Office, Supplementary European Search Report for European Patent Application No. EP 20922643.0, dated Oct. 30, 2023, 8pp.

* cited by examiner

AUTOMATIC WET WIPE PAPER-TOWEL DISPENSER

CROSS REFERENCE TO RELATED APPLICATIONS

This application is a National Phase of PCT Patent Application No. PCT/IL2020/050234, having International filing date of Mar. 2, 2020, the contents of which are all incorporated herein by reference in their entirety.

FIELD OF THE INVENTION

The present invention relates to wet towel supplying set-ups for dispensing sanitary towels. More specifically, the present invention relates to an improved automatic wet paper-towel dispenser to be used in public areas and at home.

BACKGROUND OF THE INVENTION

Epidemiological studies continue to demonstrate the favorable positive effects of performing hand hygiene in preventing transmission of germs and protecting from various infections, thus, disposable moisturized towels are highly essential in public toilet rooms, restaurants, hospitals, shopping malls and other facilities as well as at home for use in cleaning kitchen and toilet surfaces.

Such disposable moisturized towels are commonly available in pre-moistened paper-towels packages. However, when the pack is opened, it cannot be well sealed and wipes become dry and useless over time. Also, these pre-moistened paper-towels have a relatively short shelf life and thus will dry and become useless relatively quickly. This incurs excessive expenses as well as an increased environmental pollution when such useless dried towels are thrown to the trash.

Various mechanisms for holding paper towels for moistening them just prior to dispensing are available nowadays. However, such mechanisms suffer from liquid drips which pollute the environment as well as to loss of the wetting liquid and thus are rendered ineffective. It is, therefore, an aim of the present invention to provide an improved paper-towel dispenser that overcomes the above problem, e.g., a paper-towel dispenser which supplies moisturized paper-towels while keeping a contaminant-free environment.

SUMMARY OF THE INVENTION

The hygiene dispenser of the present invention is a non-drip dispenser which is highly advantageous over pump-based dispensing systems available nowadays.

Pump-based dispensing systems are associated with continuous drips of liquid in two occasions:

1. At the beginning of each new cycle, liquid keeps dripping as long as the pump pressure is building up and is not high enough for spraying. As soon as the pressure is high enough for spraying, liquid stops dripping.
2. At the end of each dispensing cycle, as soon as the pump pressure starts decreasing and as long as there is liquid in the line.

Technically, it is impossible to avoid such leaks in pump-based dispensing systems, and therefore, pump-based dispensing systems must be equipped with a container/tray for collecting the liquid drips.

Pump-based dispensing systems are thus disadvantageous for including standing liquid/water which are associated with:

- loss of wetting liquid;
- mosquito nesting sites, i.e., provides mosquitoes with available water/humid sources to lay their eggs and reproduce;
- bacteria breeding, contaminations, and possible stains; and
- a significant energy loss, i.e., electricity consumption associated with heating and evaporating such standing liquid.

The hygiene dispenser of the present invention overcomes such major drawback of pump-based dispensing system as it provides a non-drip dispensing process based on air spraying which keeps the working area clean and sterile.

In accordance with some embodiments of the present invention, the hygiene dispenser of the present invention is to be considered as a supplementary product for the line of pre-moistened wipe paper-towels and is intended to replace them mainly in public areas as mentioned earlier.

Thus, in accordance with some embodiments of the present invention, there is provided a a non-drip hygiene dispenser for dispensing a wipe paper-towel while keeping a clean and sterile working area, said dispenser comprising:

a wipe paper-towel, at least one reservoir containing liquid, a first stream of compressed air, an anti-dripping nozzle, said anti-dripping nozzle comprising activating means and a dispensing tip, said activating means comprising a retractable anti-drip needle backed by a spring, said spring retracting backwards when compressed air of said first stream of compressed air is pressing said spring, thus retracting said anti-drip needle, and thus, unblocking said dispensing tip to allow liquid from said at least one reservoir to flow through said dispensing tip, and when said compressed air pressing said spring is released, said retractable anti-drip needle returning to its original place, blocking said dispensing tip to completely block the passage of liquid, remained in said dispenser immediately upon shut off of said dispenser, through said dispensing tip to avoid undesired dripping, a second stream of compressed air entering said anti dripping nozzle, said second compressed air is sprayed and mixes with said sprayed liquid in order to form a foggy environment around the wipe paper-towel, rolling means, and cutting means, wherein, when said non-drip hygiene dispenser is activated, a dispense cycle is initiated enabling said first stream of compressed air to flow into said anti-dripping nozzle to press said spring and retract said anti-drip needle to allow said liquid to flow into the dispensing tip of said anti-dripping nozzle for spraying onto said wipe paper-towel, said wipe paper-towel is then cut into an individual piece via said cutting means, and said rolling means conveying said wipe paper-towel, wherein at the end of the dispense cycle said compressed air pressing said spring is released, as a result of which, said anti-drip needle is returning to its original position, and thus, blocking said dispensing tip and thus preventing drips.

Furthermore, in accordance with some embodiments of the present invention, the non-drip hygiene dispenser further comprising a second stream of compressed air entering said anti dripping nozzle, said second compressed air is sprayed and mixes with said sprayed liquid in order to form a foggy environment around the wipe paper-towel.

Furthermore, in accordance with some embodiments of the present invention, the non-drip dispenser further comprising an air accumulator for holding said compressed air.

Furthermore, in accordance with some embodiments of the present invention, the non-drip dispenser further comprising an air compressor for providing said compressed air and for maintaining a pre-defined pressure in said accumulator.

Furthermore, in accordance with some embodiments of the present invention, the non-drip hygiene dispenser further comprises a heater for heating a portion of said second stream of compressed air entering said anti-dripping nozzle to be mixed with said sprayed liquid in order to form a foggy environment around the wipe paper-towel.

Furthermore, in accordance with some embodiments of the present invention, the non-drip hygiene dispenser further comprising a heater for heating a third stream of compressed air, said third stream of compressed warm air is directed into an air spray nozzle for spraying said wipe paper-towel after being wetted.

Furthermore, in accordance with some embodiments of the present invention, the heater is either an internal electrical heating element or an external heater.

Furthermore, in accordance with some embodiments of the present invention, the external heater is selected from a heat exchanger, an electrical heating belt, and an electrical heating blanket.

Furthermore, in accordance with some embodiments of the present invention, the rolling means comprises a set of rollers, and a first drive motor for rolling rollers, and thus, for pulling said wipe paper-towel.

Furthermore, in accordance with some embodiments of the present invention, the cutting means comprises at least one cutter, a second drive motor for driving said cutter, and air bladders inflatable with compressed air to hold the wipe paper-towel firmly when said at least one cutter is activated.

Furthermore, in accordance with some embodiments of the present invention, the at least one liquid reservoir contains liquid selected from distilled water, alcohols, detergents, oil emulsions and a mixture thereof to enable a user to choose his/her desired liquid/liquid scent.

Furthermore, in accordance with some embodiments of the present invention, the non-drip hygiene dispenser is activated by a sensor selected from a touch sensor, a motion sensor, a sound sensor, an acoustic sensor or any other type of electrical or magnetic switch operable to activate the cycle of said non-drip hygiene dispenser.

Furthermore, in accordance with some embodiments of the present invention, the non-drip hygiene dispenser further comprises a control unit.

Furthermore, in accordance with some embodiments of the present invention, the control unit comprises a module which includes an increasing counter that indicates the number of times said non-drip hygiene dispenser is activated.

Furthermore, in accordance with some embodiments of the present invention, the counter is above a predefined threshold, said control unit transfers an alert for replacing/filling up the various components of hygiene dispenser.

Furthermore, in accordance with some embodiments of the present invention, the alert is transferred to the user/maintenance person via wireless communication.

Furthermore, in accordance with some embodiments of the present invention, the non-drip hygiene dispenser contains a wall mounted enclosure and may be mounted to a vertical wall.

Furthermore, in accordance with some embodiments of the present invention, the non-drip hygiene dispenser sets the degree of wetting, either partially or totally wetted wipe paper-towel.

Furthermore, in accordance with some embodiments of the present invention, the reservoir comprising a sensor for detecting the liquid level in said reservoir.

DETAILED DESCRIPTION OF THE FIGURES

Figure 1:
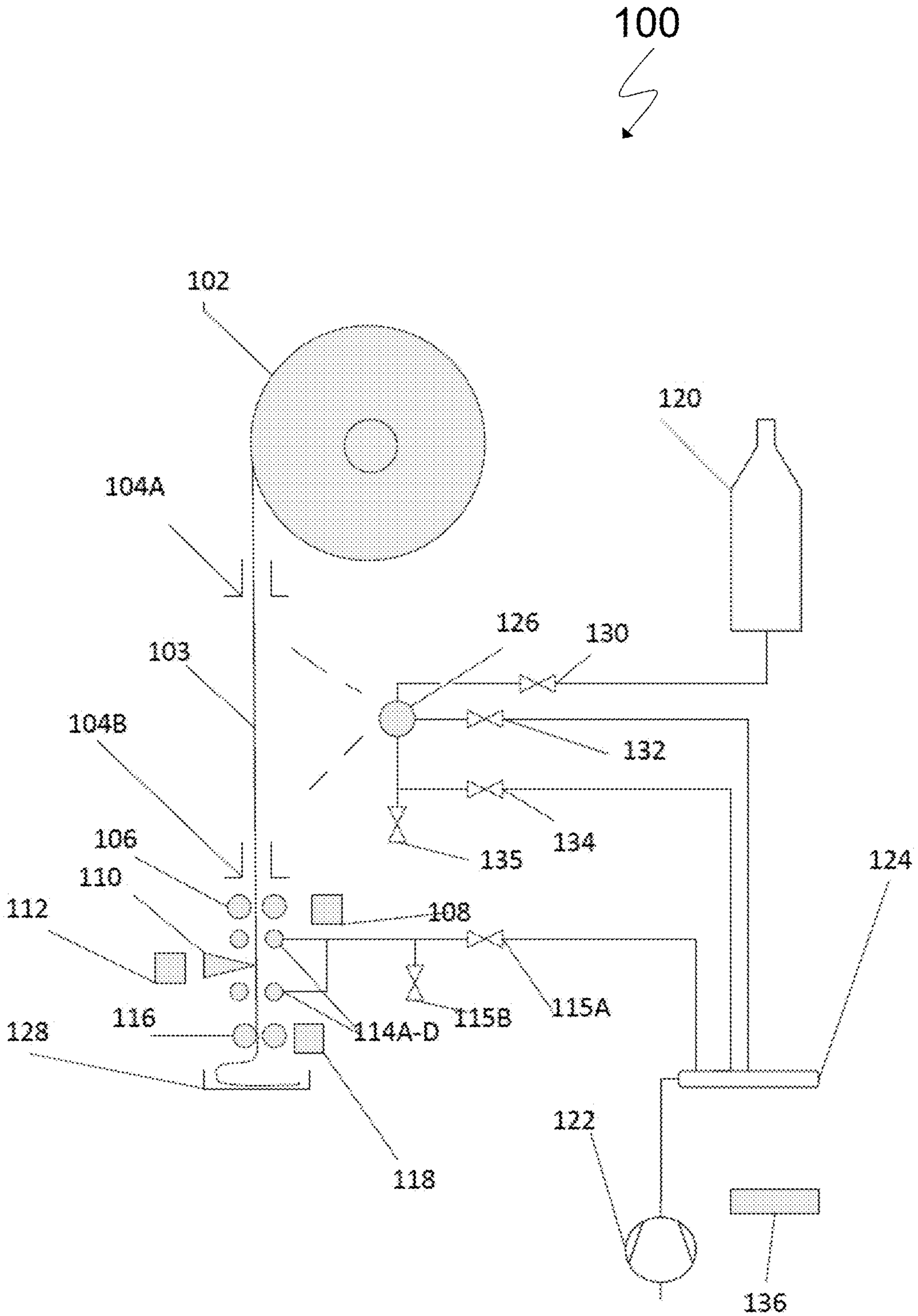
FIG. 1 illustrates a first hygiene dispenser in accordance with some embodiments of the present invention.

FIG. 1 illustrates a first hygiene dispenser 100 in accordance with some embodiments of the present invention. First hygiene dispenser 100 comprises wipe paper-towel roll 102, wipe paper-towel 103, two pairs of guide plates 104A&B, a set of rollers 106 and a first drive motor 108 for rolling rollers 106 which pull paper-towel 103, at least one cutter 110, a second drive motor 112 for driving at least one cutter 110, inflatable air bladders 114A-D which are inflated with compressed air to hold the paper-towel firmly when cutter 110 is activated, a set of rollers 116 and its corresponding motor 118 to roll the sheared paper-towel, liquid reservoir 120, miniature air compressor 122, air accumulator 124, anti-dripping nozzle 126, a wipe paper-towel receiver 128, liquid inlet valve 130, first air inlet valve 132 for spraying, second air inlet valve 134 to open the path of the liquid, a third air valve 135 for air release, a fourth air valve 115A to pressurize air bladders 114A-D, a fifth air valve 115B to release the air from air bladders 114A-D and, a control unit 136.

In accordance with some embodiments of the present invention, hygiene dispenser 100 may be an automatic dispenser and as such may be activated by a touch sensor which may be used for capturing a physical touch by a user, a motion sensor for sensing the presence of a hand near the dispenser, a sound sensor for detecting human voices, an acoustic sensor or any other type of electrical or magnetic switch operable to activate the cycle of hygiene dispenser 100.

In accordance with some embodiments of the present invention, once hygiene dispenser 100 is activated, the valves open/close in a preset duration and sequence to allow for spraying, wetting and cutting the wipe paper-towel, i.e., air valve 135 closes, liquid valve 130, air valves 132 and 134 open in a preset sequence to allow spraying/wetting the paper-towel. At the end of the spraying/wetting stage, first drive motor 108 rotates rollers 106 to convey wipe paper-towel 103, inflatable air bladders 114A-D are inflated with compressed air to hold the paper-towel firmly, and cutter 110 is activated to cut the wipe paper-towel. In accordance with some embodiments of the present invention, liquid may be fed into anti-dripping nozzle 126 by gravity as seen in the figure, by suction, or by any other way.

After rolling down the wetted paper-towel, inflatable air bladders 114A&D are inflated with compressed air via air valve 115A to hold wipe paper-towel 103 in place when wipe paper-towel 103 is cut into an individual piece. Then, rollers 116 roll to transfer the individual piece to tray 128 to be picked up.

Miniature air compressor 122 maintains the required pressure in accumulator 124 at any time and can be programmed to operate in the absence of users.

In accordance with some embodiments of the present invention, hygiene dispenser 100 can be connected to compressed air pipe lines available in public places such as workshops, hospitals or in industries Such compressed air pipe lines can back up miniature air compressor 122 in case of a failure.

In accordance with some embodiments of the present invention, liquid reservoir 120 may contain liquid selected from, but not limited to, water, alcohol, detergent, oil emulsions and a mixture thereof depending on the desired application.

In accordance with some embodiments of the present invention, control unit 136 may comprise a module which includes an increasing counter that indicates the number of times of using the hygiene dispenser 100, i.e., the number of time hygiene dispenser 100 is activated. When the counter is above a predefined threshold, control unit 136 transfers an alert for replacing/filling up the various components of hygiene dispenser 100.

In accordance with some embodiments of the present invention, the alert is transferred to the user/maintenance person via wireless communication.

In accordance with some embodiments of the present invention, hygiene dispenser 100 contains a wall mounted enclosure and may be mounted to a vertical wall.

In accordance with some embodiments of the present invention, hygiene liquid dispenser may comprise multiple liquid reservoirs containing various types of liquid such as, but not limited to, distilled water, alcohol, and oils to enable the user to choose his/her desired liquid/liquid scent. In addition, the user may be able to define the degree of wetting, i.e., either partially or totally wetted wipe paper-towel.

In accordance with some embodiments of the present invention, hygiene dispenser 100 may include an additional air accumulator 202 equipped with heating means.

Figure 2:
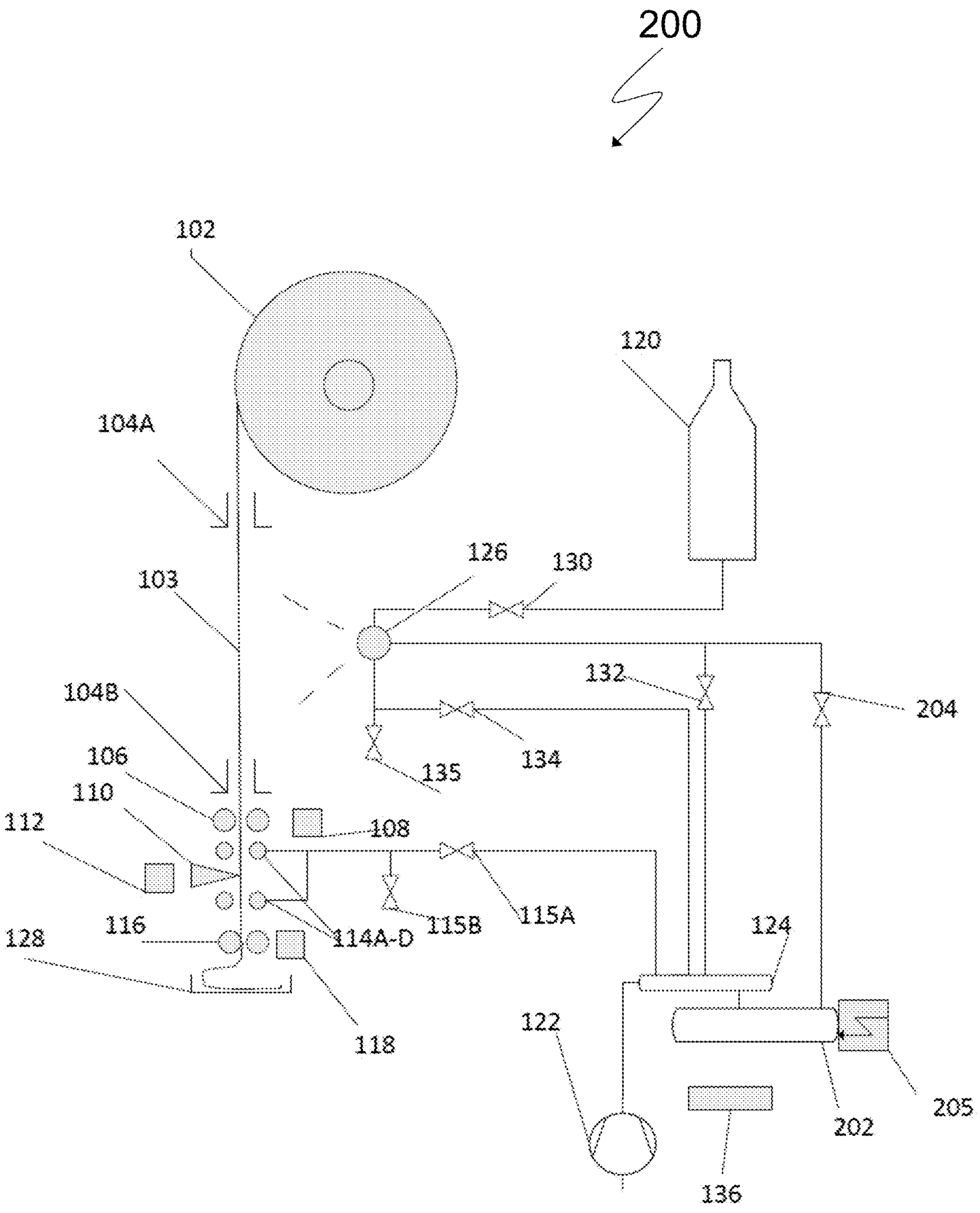
FIG. 2 illustrates a second hygiene dispenser in accordance with some embodiments of the present invention.

This way hot sprayed air is mixed with the sprayed liquid onto wipe paper-towel 103 and thus for providing warm wet wipes as seen in FIG. 2.

FIG. 2 illustrates a second hygiene dispenser 200 in accordance with some embodiments of the present invention. Hygiene dispenser 200 may comprise the components of hygiene dispenser 100 with the addition of a second air accumulator 202, and a heater 205 to warm air. Heater 205 may be an internal electrical heating element. Alternatively, heater 205 may be an external heater such as, for instance, a heat exchanger, an electrical heating belt, an electrical heating blanket and the like.

Thus, in accordance with some embodiments of the present invention, air flows from the "hot" air accumulator 202, through air valve 204 into anti-dripping nozzle 126 where it is being mixed with liquid and sprayed onto wipe paper-towel 103.

As seen in FIG. 2, second air accumulator 202 may be continuously filled with air from accumulator 124 and heated via heater 205 to supply warm air for spraying and thus for warming wipe paper-towel 103 prior to being cut and served.

Alternatively, wipe paper-towel 10 3 may be sprayed with warm air at the end of the wetting/spraying stage in accordance with some embodiments of the present invention.

Figure 3:
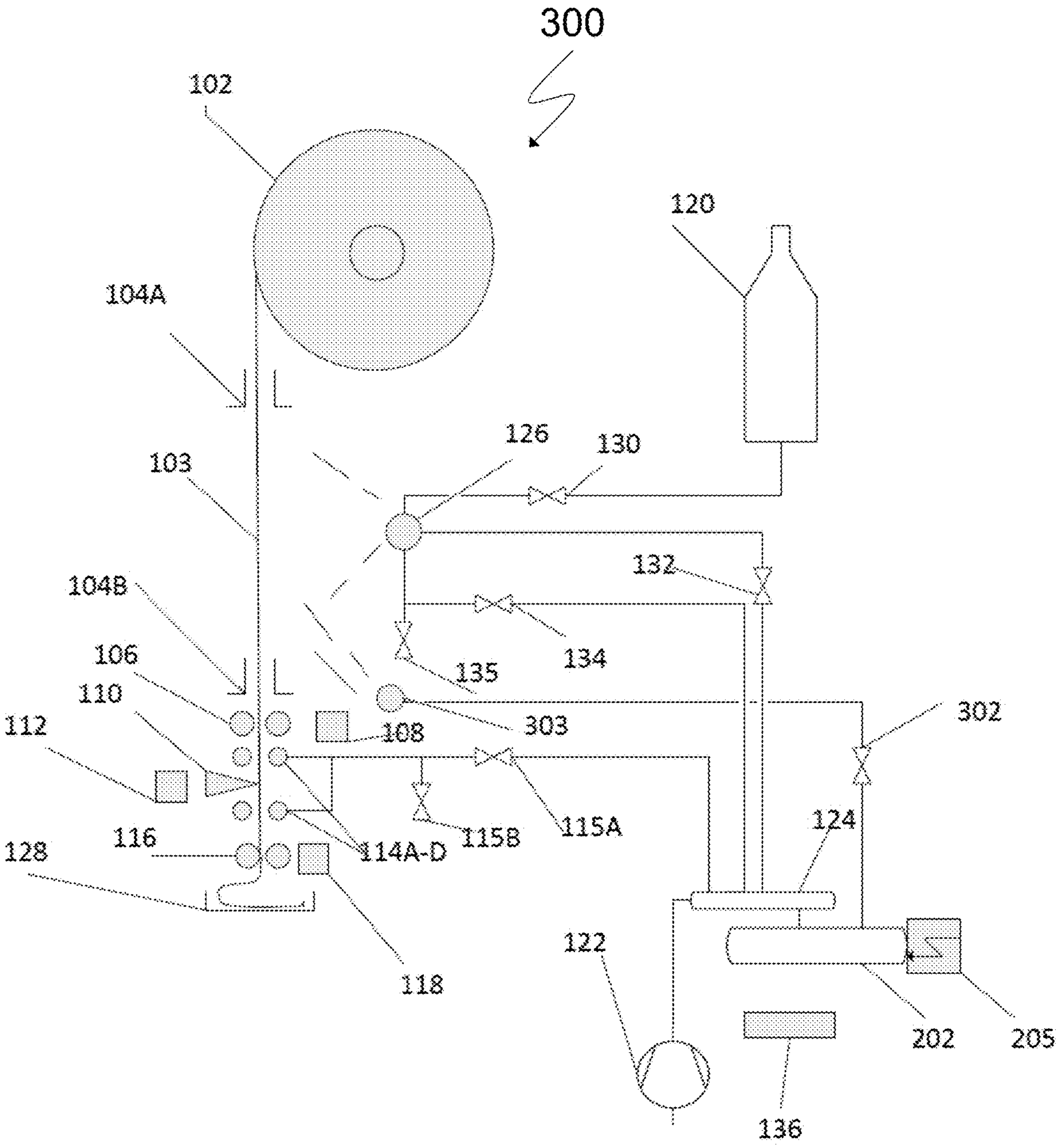
FIG. 3 illustrates a third hygiene dispenser in accordance with some embodiments of the present invention.

FIG. 3 illustrates a third hygiene dispenser 300 in accordance with some embodiments of the present invention. Hygiene dispenser 300 may comprise the components of hygiene dispenser 200 with some modifications, i.e., in this case, warm air is directed to the wipe paper-towel enclosure rather than into anti-dripping nozzle 126. More specifically, warm air flows through air valve 302 into air spray nozzle 303 for spraying warm air onto wipe paper-towel 103 at the end of the wetting/spraying stage and prior wipe paper-towel 103 is being cut and served.

Figure 4A:
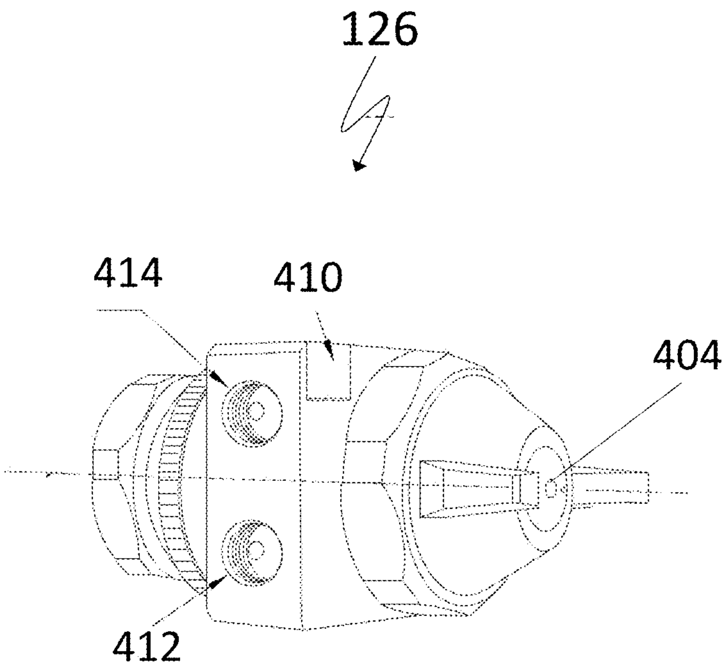
FIG. 4A is a perspective view of the anti-dripping nozzle of the present invention.
Figure 4B:
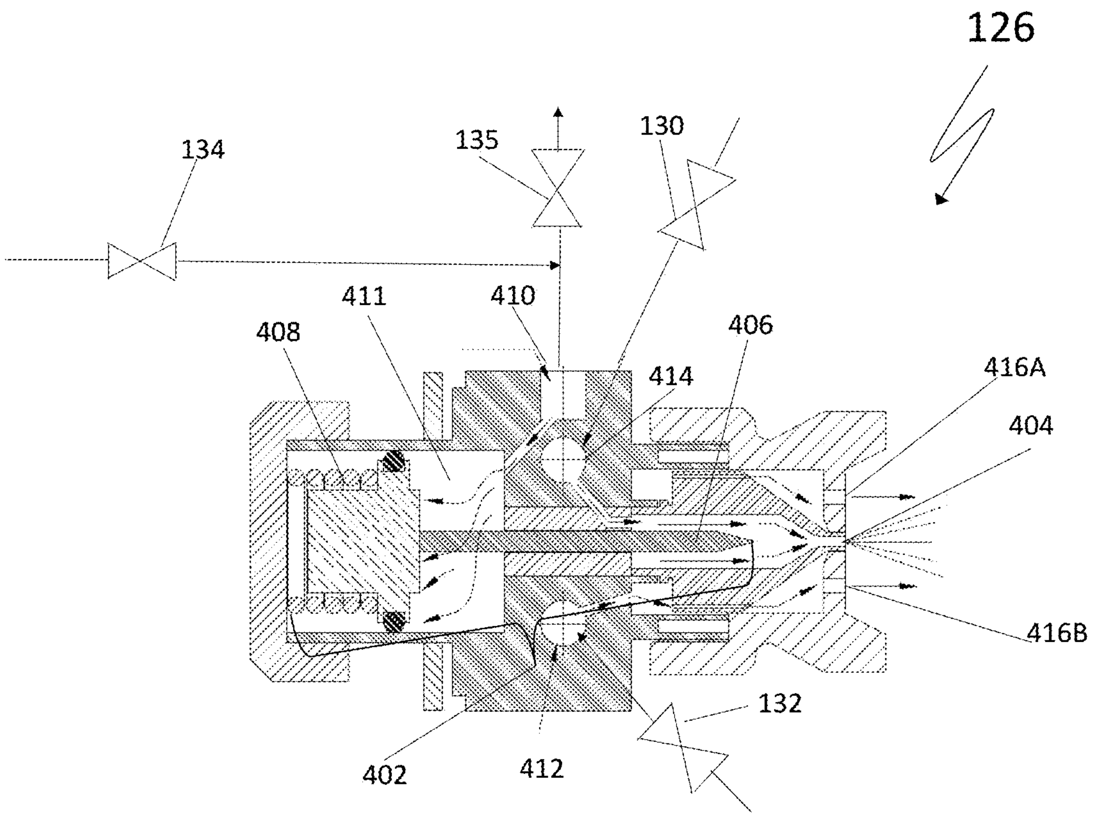
FIGS. 4B&C are cross-sectional views of the anti-dripping nozzle in accordance with some embodiments of the present invention.
Figure 4C:
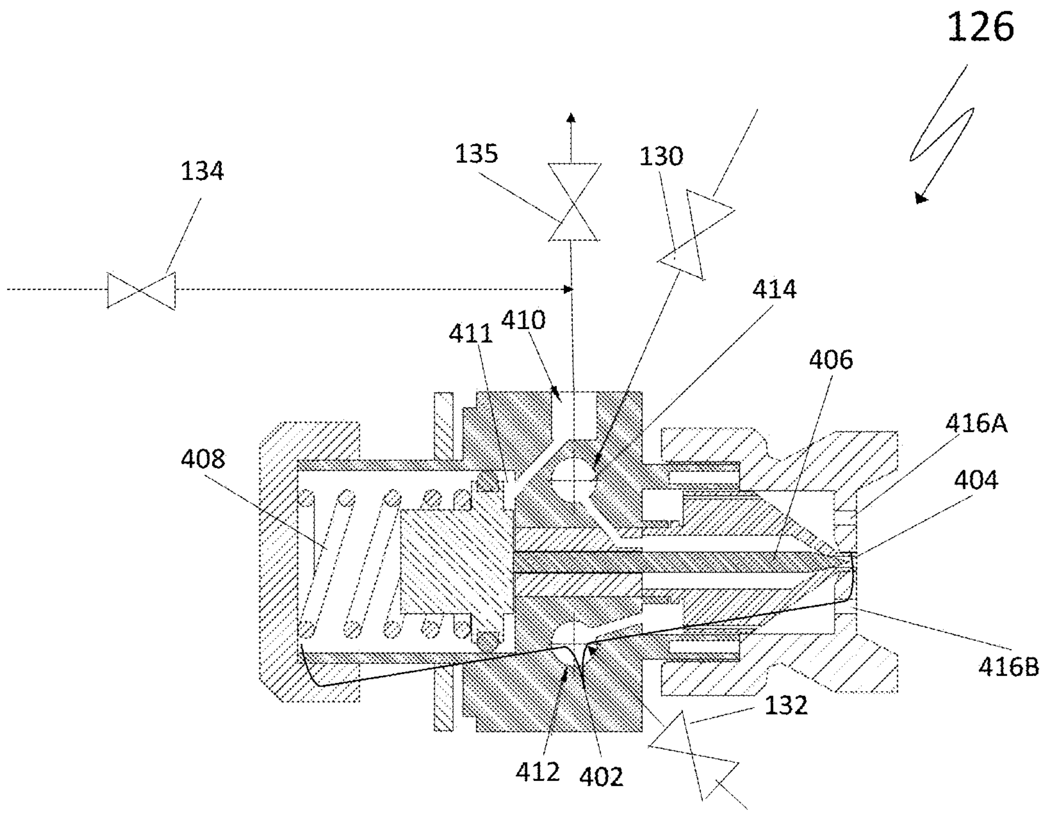

FIGS. 4A-C illustrate a commercially available anti-dripping nozzle 126 of the present invention.

FIGS. 4B&C are cross-sectional views of anti-dripping nozzle 126 in accordance with some embodiments of the present invention. In FIG. 4B, anti-dripping nozzle 126 is in operation, i.e., valve 135 is closed while valves 130, 132, 134 are open.

In FIG. 4C, nozzle 126 is at rest, i.e., valve 135 is open while valves 130, 132, 134 are closed.

The anti-dripping nozzle 126 comprises activating means 402 and a liquid dispensing tip 404 and multiple air tips, such as air tips 416A&B. The activating means 402 comprises a retractable anti-drip needle 406 backed by a spring 408.

When compressed air is pressing the spring 408, the retractable anti-drip needle 406 is retracting backwards, thus, allowing fluid to flow to dispensing tip 404.

When the compressed air pressing the spring 408 is released, the spring 408 is returning to its original position, and so as the retractable anti-drip needle 406 is returning to its original position, blocking the passage of fluid to the dispensing tip 404 and thus preventing drips.

Thus, as seen in FIG. 4B, when a first stream of compressed air is flowing through fluid inlet 410 into chamber 411, the compressed air in chamber 411 is pressing the spring 408 and thus retracting the retractable anti-drip needle 406. As long as the retractable anti-drip needle 406 is retracted, a liquid stream flowing into fluid inlet 414 for spraying reaches the dispensing tip 404.

At the end of the dispense cycle, the compressed air pressing the spring 408 is released through valve 135, thus, the spring 408 is returning back to its original position, and thus the anti-drip needle 406 is swinging forward and blocking the passage of liquid to the dispensing tip 404.

As seen in the figures, a second stream of compressed air is entering fluid inlet 412 and passing to multiple tips, such as tips 416A&B, in order to be mixed with the jet of liquid flowing out of the dispensing tip 404 to form a foggy area around the wipe paper-towel 103.

The invention claimed is:

1. A non-drip hygiene dispenser for dispensing a wipe paper-towel while keeping a clean and sterile working area, said dispenser comprising:

a wipe paper-towel, at least one reservoir containing liquid, a first stream of compressed air, an anti-dripping nozzle, said anti-dripping nozzle comprising activating means and a dispensing tip, said activating means comprising a retractable anti-drip needle backed by a spring, said spring retracting backwards when compressed air of said first stream of compressed air is pressing said spring, thus retracting said anti-drip needle, and thus, unblocking said dispensing tip to allow liquid from said at least one reservoir to flow through said dispensing tip, and when said compressed air pressing said spring is released, said retractable anti-drip needle returning to its original place, blocking said dispensing tip to completely block the passage of liquid, remained in said dispenser immediately upon shut off of said dispenser, through said dispensing tip to avoid undesired dripping, a second stream of compressed air entering said anti dripping nozzle, said second compressed air is sprayed and mixes with said sprayed liquid in order to form a foggy environment around the wipe paper-towel, rolling means, and cutting means, wherein, when said non-drip hygiene dispenser is activated, a dispense cycle is initiated enabling said first stream of compressed air to flow into said anti-dripping nozzle to press said spring and retract said anti-drip needle to allow said liquid to flow into the dispensing tip of said anti-dripping nozzle for spraying onto said wipe paper-towel, said wipe paper-towel is then cut into an individual piece via said cutting means, and said rolling means conveying said wipe paper-towel, wherein at the end of the dispense cycle said compressed air pressing said spring is released, as a result of which, said anti-drip needle is returning to its original position, and thus, blocking said dispensing tip and thus preventing drips and loss of liquid to the environment.

2. The non-drip hygiene dispenser of claim 1, wherein said non-drip dispenser further comprising an air accumulator for holding said compressed air.

3. The non-drip hygiene dispenser of claim 2, wherein said non-drip dispenser further comprising an air compressor for providing said compressed air and for maintaining a pre-defined pressure in said accumulator.

4. The non-drip hygiene dispenser of claim 1 further comprises a heater for heating a portion of said second stream of compressed air entering said anti-dripping nozzle to be mixed with said sprayed liquid in order to form a foggy environment around the wipe paper-towel.

5. The non-drip hygiene dispenser of claim 4, wherein said heater is either an internal electrical heating element or an external heater.

6. The non-drip hygiene dispenser of claim 5, wherein said external heater is selected from a heat exchanger, an electrical heating belt, and an electrical heating blanket.

7. The non-drip hygiene dispenser of claim 1 further comprising a heater for heating a third stream of compressed air, said third stream of compressed warm air is directed into an air spray nozzle for spraying said wipe paper-towel after being wetted.

8. The non-drip hygiene dispenser of claim 7, wherein said heater is either an internal electrical heating element or an external heater.

9. The non-drip hygiene dispenser of claim 8, wherein said external heater is selected from a heat exchanger, an electrical heating belt, and an electrical heating blanket.

10. The non-drip hygiene dispenser of claim 1, wherein said rolling means comprises a set of rollers, and a first drive motor for rolling rollers, and thus, for pulling said wipe paper-towel.

11. The non-drip hygiene dispenser of claim 1, wherein said cutting means comprises at least one cutter, a second drive motor for driving said cutter, and air bladders inflatable with compressed air to hold the wipe paper-towel firmly when said at least one cutter is activated.

12. The non-drip hygiene dispenser of claim 1, wherein said at least one liquid reservoir contains liquid selected from distilled water, alcohols, detergents, oil emulsions and a mixture thereof to enable a user to choose his/her desired liquid/liquid scent.

13. The non-drip hygiene dispenser of claim 1, wherein said non-drip hygiene dispenser is activated by a sensor selected from a touch sensor, a motion sensor, a sound sensor, an acoustic sensor or any other type of electrical or magnetic switch operable to activate the cycle of said non-drip hygiene dispenser.

14. The non-drip hygiene dispenser of claim 1 further comprises a control unit.

15. The non-drip hygiene dispenser of claim 14, wherein said control unit comprises a module which includes an increasing counter that indicates the number of times said non-drip hygiene dispenser is activated.

16. The non-drip hygiene dispenser of claim 15, wherein said counter is above a predefined threshold, said control unit transfers an alert for replacing/filling up the various components of hygiene dispenser.

17. The non-drip hygiene dispenser of claim 16, wherein said alert is transferred to the user/maintenance person via wireless communication.

18. The non-drip hygiene dispenser of claim 1, wherein said non-drip hygiene dispenser contains a wall mounted enclosure and may be mounted to a vertical wall.

19. The non-drip hygiene dispenser of claim 1, wherein said non-drip hygiene dispenser sets the degree of wetting, either partially or totally wetted wipe paper-towel.

20. The non-drip hygiene dispenser of claim 1, wherein said reservoir comprising a sensor for detecting the liquid level in said reservoir.

* * * * *